(12) United States Patent
Dal Pra'

(10) Patent No.: US 6,676,095 B2
(45) Date of Patent: Jan. 13, 2004

(54) CLAMP FOR FIXING THE SEAT POST OF A BICYCLE

(75) Inventor: Giuseppe Dal Pra', Vicenza (IT)

(73) Assignee: Campagnolo S.r.l., Vicenza (IT)

(*) Notice: Subject to any disclaimer, the term of this patent is extended or adjusted under 35 U.S.C. 154(b) by 0 days.

(21) Appl. No.: 09/987,079

(22) Filed: Nov. 13, 2001

(65) Prior Publication Data

US 2002/0056795 A1 May 16, 2002

(30) Foreign Application Priority Data

Nov. 14, 2000 (IT) ..................... TO2000A1065

(51) Int. Cl.[7] ............ A47B 96/06; E04G 3/00; F16B 1/00; G09F 7/18
(52) U.S. Cl. .............. 248/230.3; 248/230.1; 248/230.5; 248/316.1; 248/316.4; 24/279; 24/20 LS

(58) Field of Search .............. 248/230.1, 230.3, 248/230.5, 231.41, 231.61, 316.6, 316.1, 316.4; 24/278, 279, 20 LS; 403/373, 370, 371; 297/195.1

(56) References Cited

U.S. PATENT DOCUMENTS

| 3,159,708 A | * 12/1964 | Deal ............ 174/40 CC |
| 4,240,184 A | * 12/1980 | Delhees et al. ......... 24/279 |
| 4,464,814 A | * 8/1984 | Senatro ............ 24/20 EE |

* cited by examiner

Primary Examiner—Ramon O. Ramirez
Assistant Examiner—Amy J. Sterling
(74) Attorney, Agent, or Firm—Volpe and Koenig, P.C.

(57) ABSTRACT

A clamp for fixing a seat post to a seat tube provided with a slit in a longitudinal vertical plane. The clamp has a pair of deformable branches defining a through hole having a cylindrical inner surface; a slit between the elastically deformable branches; and a tightening screw that draws up the two facing surfaces and reduces the diameter of the cylindrical inner surface.

14 Claims, 2 Drawing Sheets

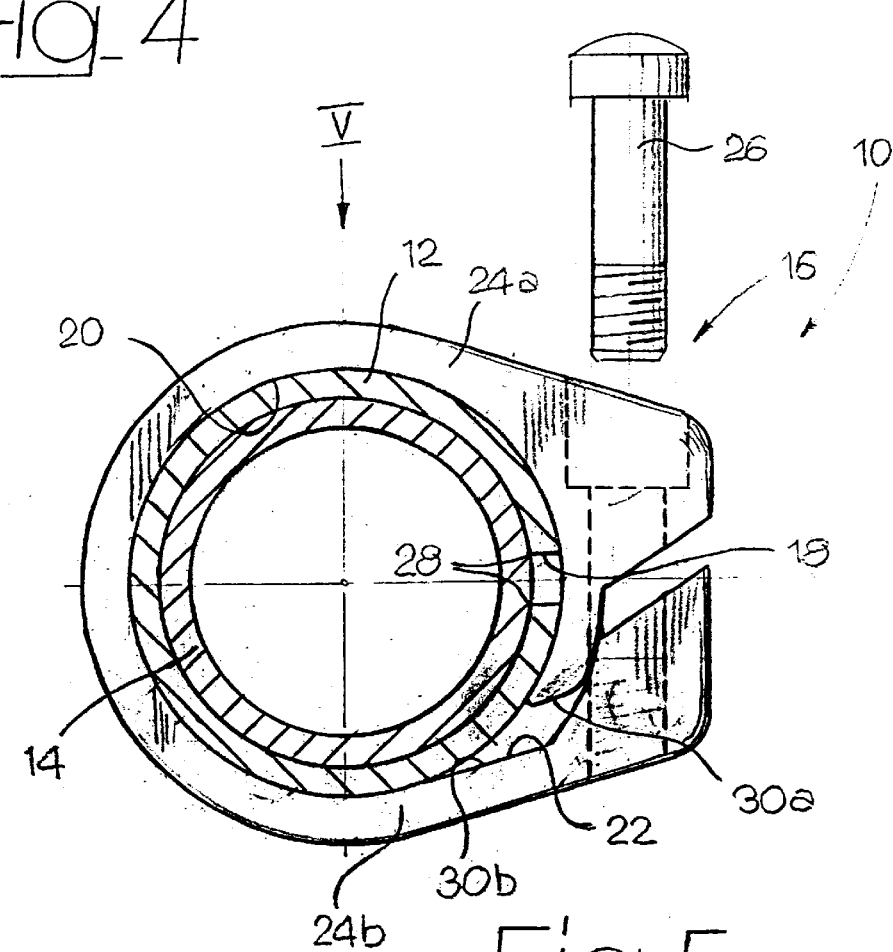
Fig_4
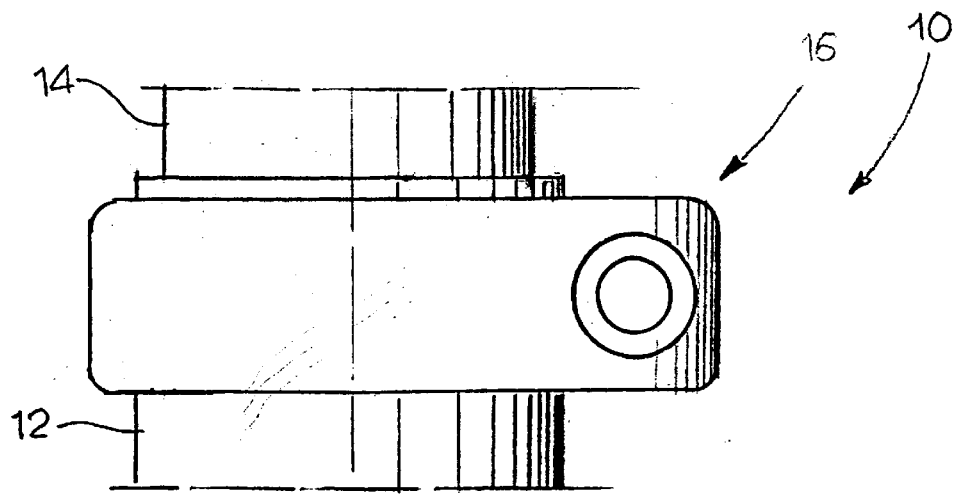
Fig_5

CLAMP FOR FIXING THE SEAT POST OF A BICYCLE

BACKGROUND OF THE INVENTION

The present invention relates to a clamp for fixing a seat post to a seat tube of a bicycle.

As is known, the saddle of a bicycle is carried by a tubular element (seat post) which is slidably inserted inside a vertical tube, namely, the seat tube, of the bicycle frame. The seat tube carrying the seat post is provided with a through slit made in an end portion of the tube, which bestows on said end portion characteristics of elastic deformability in the radial direction. The end portion of the seat tube is tightened against the outer surface of the seat post by means of a clamp having a slit which is set aligned to the slit of the seat tube and which is radially compressed by means of a screw which brings two elastically deformable branches of the clamp up to one another. For aesthetic reasons, the tightening screw is set on the side of the seat tube that faces the rear part of the bicycle.

Recently there have been introduced on the market seat posts made of carbon fiber, which consist of a fiber fabric embedded in a matrix of plastic material. A seat post made of carbon fiber makes it possible to obtain a reduction in weight as compared to a component having the same characteristics which is made, for instance, of an aluminium alloy or similar light alloys.

The traditional solution described previously for fixing the seat post to the seat tube presents a serious drawback in the case where the seat post is made of a carbon-fiber fabric embedded in a matrix of plastic material. The present applicant has found that, when a clamp of a traditional type is tightened around the end portion of the seat tube, the two internal edges defined by the through slit of the seat tube are deformed inwards and tend to cut into the outer surface of the seat post. These incisions form points of initiation of failure, which in certain cases may lead to failure of the seat post.

SUMMARY OF THE INVENTION

The purpose of the present invention is to overcome the aforesaid drawback by providing a simple and effective solution that does not entail the need to modify the seat tubes with respect to current solutions and that makes it possible to keep the tightening screw set in the rear part of the seat tube.

According to the present invention, the above purpose is achieved by a clamp having the characteristics specified in claim 1.

BRIEF DESCRIPTION OF THE DRAWINGS

The present invention will now be described in detail with reference to the attached drawings, provided purely by way of non-limiting example, in which:

FIG. 4 is a cross-sectional view similar to that of FIG. 2 and illustrating a second embodiment of the present invention; and FIG. 5 is an elevation according to the arrow V of FIG. 4.

DETAILED DESCRIPTION OF THE INVENTION

Figure 1:
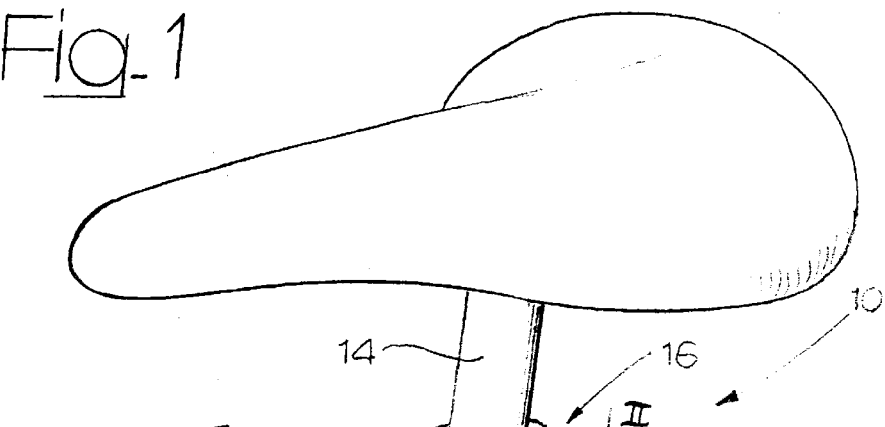
FIG. 1 is a schematic perspective view illustrating a seat-post assembly provided with a clamp according to the present invention.

With reference to FIG. 1, number 10 designates, as a whole, a seat-post assembly for a bicycle, comprising a seat tube 12, a seat post 14 and a clamp 16.

Figure 2:
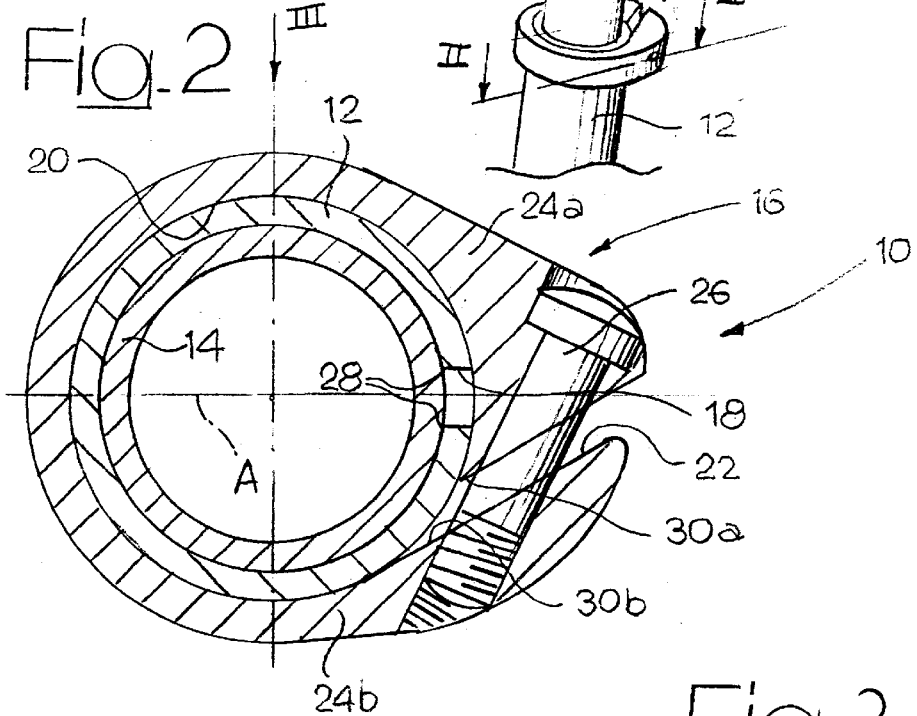
FIG. 2 is a cross-sectional view according to the line II—II of FIG. 1.
Figure 3:
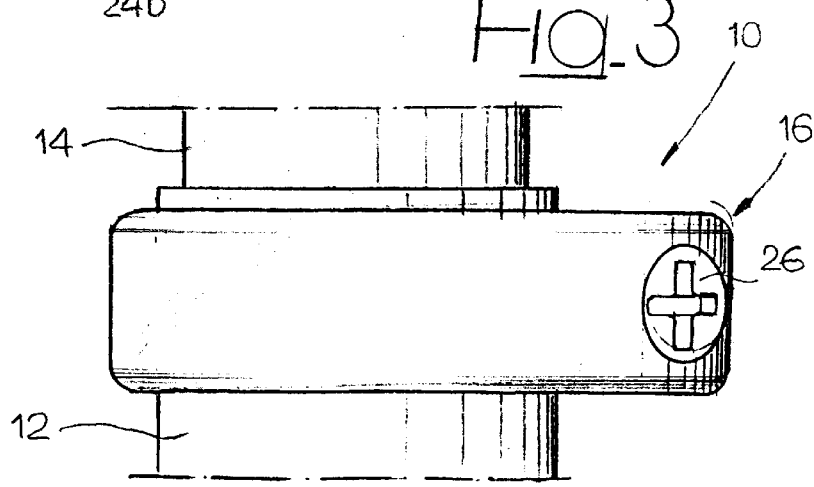
FIG. 3 is an elevation according to the arrow III of FIG. 2.

With reference to FIG. 2, the seat tube 12 has, in a traditional way, a through slit 18 which extends as far as the top end of the seat tube 12. The through slit 18 is set in a longitudinal vertical plane the trace of which, in the plane of representation of FIG. 2, is indicated by the axis A. The slit 18 is situated on the side of the seat tube 12 that faces the rear part of the bicycle.

The clamp 16 is made of metal material, such as aluminium or one of its alloys, and has a cylindrical surface 20 designed to compress from outside the top end portion of the seat tube 12. The clamp 16 has a through slit 22 which defines two elastically deformable branches 24a, 24b. The two deformable branches 24a, 24b are elastically brought up to one another so as to reduce the diameter of the cylindrical surface 20 by tightening a screw 26. According to the present invention, the clamp 16 is configured in such a way that, in an assembled configuration in which the screw 26 is set in a position corresponding to the slit 18, the slit 22 opens out onto the cylindrical surface 20 in a position that is displaced with respect to the slit 18 of the seat tube 12. Tests carried out by the present applicant have shown that the misalignment between the slits 22 and 18 guarantees that, during tightening of the screw 26, the end portion of the seat tube 12 will close radially without producing a deformation inwards of the edges 28.

In the embodiment illustrated in FIG. 2, the slit 22 of the clamp 16 has two surfaces 30a, 30b facing one another, which are plane, parallel to one another and inclined with respect to a plane orthogonal to the longitudinal axis A of the tightening screw 36. The direction of the screw 36 is determined in such a way that the surfaces 30a, 30b facing one another of the slit 22 remain constantly parallel to one another during tightening of the screw 26. Thanks to the configuration of the clamp 16, the mutual approach of the two facing surfaces 30a, 30b takes place without producing a concentration of forces on the edges of the seat tube 12 that are adjacent to the slit 28. This makes it possible to obtain radial closing of the seat tube 12 with a mutual approach in the tangential direction of the edges facing one another of the slit 18, without any deformation inwards of the edges 18. In this way, the risk is eliminated of producing incisions on the outer surface of the seat post 14, which could lead to initiation of failure.

FIG. 4 illustrates a variant of the clamp according to the present invention. The items corresponding to the ones previously described are designated by the same reference numbers. Unlike in the embodiment previously described, the screw 26 extends according to an axis transverse to the longitudinal axis A. Also in this variant embodiment, the slit 22 of the clamp is displaced in the tangential direction with respect to the slit 18 of the seat tube 12. Also in this case, the mutual approach between the two surfaces 30a 30b facing one another of the slit 22 is along a direction tangential to the tube and in a position that does not entail a concentration of forces on the edges 28 of the seat tube 12. The main difference with respect to the embodiment described previously is that in the present case the surfaces 30a, 30b facing one another of the slit 22 are step-like surfaces with respective end portions which are parallel to one another. The end portions that open out onto the inner cylindrical surface are substantially orthogonal to the axis of the screw 26, i.e., they are substantially parallel to a plane orthogonal to the axis of the screw, but could also be inclined with respect to said plane.

Of course, without prejudice to the principle of the invention, the details of construction and the embodiments may vary widely with respect to what is described and illustrated herein, without thereby departing from the scope of the present invention as defined in the ensuing claims.

What is claimed is:

1. A clamp for fixing a seat post to the seat tube of a bicycle, said seat tube provided with a slit set in a longitudinal vertical plane and said slit located on the rearward facing portion of the seat tube, comprising:
   a pair of elastically deformable branches defining a through hole having a predetermined shape and a cylindrical inner surface, said branches integrally formed and conjoined at one end, and each branch having a free end;
   a slit between the free ends of said elastically deformable branches and,
   a tightening screw extending at an inclined angle relative to the vertical plane and set in such a way as to bring up to one another two surfaces facing one another of said slit and to reduce the diameter of said cylindrical surface while preserving the predetermined shape,
   wherein in a mounted configuration in which said tightening screw extends in a position corresponding to the through slit of the tube seat and at least a portion of the free end of one branch is positioned on opposed sides of the slit in the seat tube, the slit of the clamp opens out onto said cylindrical surface in an area immediately adjacent said slit and which is displaced with respect to the slit of the seat tube.

2. The clamp of claim 1 wherein said surfaces facing one another are step-like surfaces with end portions that are substantially parallel to one another; and
   wherein the end portions of said step-like surfaces facing one another which open out onto the inner cylindrical surface are substantially orthogonal to the longitudinal axis of said tightening screw.

3. A clamp for fixing a seat post to the seat tube of a bicycle, said seat tube having an axially-extending compression slit in the wall of the seat tube, comprising:
   a) a pair of elastically deformable branches defining a through hole having a predetermined shape and a cylindrical inner surface, said branches integrally formed and conjoined at one end and having an enlarged-thickness at the other free end;
   b) opposed face surfaces on the free ends of said branches, said face surfaces forming a clamp slit extending from an opening in the inner surface of the through hole to the exterior surface of the clamp, said clamp slit extending at an inclined angle relative to all radii extending to said opening;
   c) coaxial bores extending through the free ends of said branches, each bore extending at an inclined angle relative to said clamp slit; and,
   d) a tightening screw extending through said bores.

4. A collar grip for fixing a seat post to the seat tube of a bicycle, said seat tube having an axially-extending compression slit in the wall of the seat tube, said slit located on the rearward facing portion of the seat tube, the collar grip comprising:
   a) a clamping portion having a through hole of a predetermined shape with a cylindrical inner surface which contacts the exterior surface of the seat tube,
   b) an asymmetrical exterior surface including a symmetrical bulbous-shaped front portion and an asymmetrical tear-drop-shaped rear clamping portion;
   c) a slit dividing the clamping portion into two asymmetrical halves, said slit extending from the interior surface to the exterior surface on a rearwardly-extending, inclined angle,
   d) a bore extending through both halves of said clamping portion and through said clamp slit and without said cylindrical inner surface, said bore traversing said clamping portion at an inclined angle relative to said slit and relative to said symmetrical bulbous-shaped front portion; and,
   e) an adjustable locking bolt extending through said bore.

5. A clamp for fixing a seat post of a cycle in a seat tube having a longitudinal slit that enables it to have a first condition with first interior and exterior diameters and a second condition with second interior and exterior diameters, the clamp comprising:
   a body portion that has a generally circular aperture of a predefined shape, has an inner cylindrical surface with a diameter at least equal to the seat tube's first exterior diameter and free ends which define a slit tangential to the diameter of the cylindrical surface;
   one free end defines a through passage and the other free end defines a receptor opposite the passage; and
   a fastener located in the passage and mated with the receptor;
   whereby movement of the fastener into the receptor reduces the diameter of the cylindrical surface while preserving the generally circular aperture of predefined shape, draws the free ends together and reduces the tangential slit sufficiently to bring the cylindrical surface into contact with seat tube and the reduces the interior diameter of the seat tube to the second interior diameter and fixing contact with seat post.

6. A clamp for fixing a seat post of a cycle in a seat tube having a longitudinal slit that enables it to have a first condition with first interior and exterior diameters and a second condition with second interior and exterior diameters, the clamp comprising:
   one free end defines a through passage and the other free end defines a receptor opposite the passage; and
   a fastener located in the passage and mated with the receptor;
   whereby movement of the fastener into the receptor reduces the diameter of the cylindrical surface in a generally uniform manner, draws the free ends together and reduces the tangential slit sufficiently to bring the cylindrical surface into contact with seat tube and the reduces the interior diameter of the seat tube to the second interior diameter while maintaining its shape and fixing contact with seat post.

7. A clamp for fixing a seat post to the seat tube of a bicycle, said seat tube having an axially-extending compression slit in the wall of the seat tube, comprising:
   a) a pair of elastically deformable branches defining a through hole having a predetermined shape, a diameter and a cylindrical inner surface, said branches integrally formed and conjoined at one end and having an enlarged-thickness at the other free end;
   b) opposed face surfaces on the free ends of said branches, said face surfaces having a stepped configuration and forming a clamp slit extending to the inner surface of the through hole at an inclined angle relative to all radii extending to said through hole;
   c) coaxial bores extending through the free ends of said branches, each bore extending at an inclined angle relative to said clamp slit; and,
   d) a tightening screw extending through said bores.

8. A clamp for fixing a seat post (14) to a bicycle seat tube having a vertical slit (12), the clamp comprising:
- a pair of integrally formed and conjoined branches (24a, 24b) that define an cylindrical inner surface (20), each branch having a free end with a through hole of substantially equal size and substantially on a common centerline with the other;
- a slit (22) between the free ends of said elastically deformable branches that is set at an angle of less than 90 degrees relative to the common centerline and defines a space between the free end of the branches; and,
- a fastener (26) within the through holes and extending between branches;
- whereby tightening of the fastener reduces both the space between the free ends and the cylindrical inner surface while maintaining the through holes substantially on the centerline.

9. The clamp of claim 8 wherein the slit between the deformable branches is less than 90°.

10. A clamp for fixing a seat post to a bicycle seat tube having a vertical axis and a vertical slit parallel to the vertical axis, the clamp comprising:
- a pair of integrally formed and conjoined branches that define an cylindrical inner surface, each branch having a free end with a through hole of substantially equal size and substantially on a common center line with the other, each of the free end further defining a step-like surface;
- a separation, defined between the free ends of said elastically deformable branches, that is set at an angle relative to the common centerline and defines a space between the free ends of the branches so that the step-like surfaces are opposed;
- a fastener within the through holes and extending between branches;
- whereby tightening of the fastener reduces both the space between the free ends and the cylindrical inner surface while maintaining the through holes substantially on the centerline and drawing the step-like surfaces (30a, 30b) toward one another.

11. The clamp of claim 10 wherein the opposed step-like surfaces are substantially parallel to each other.

12. The claim of claim 11 wherein the slit between the deformable branches is less than 90°.

13. The clamp of claim 10 wherein the angle is substantially orthogonal to a longitudinal axis through the fastener.

14. The clamp of 30 wherein the opposed step-like surfaces are substantially parallel to each other.

* * * * *

UNITED STATES PATENT AND TRADEMARK OFFICE
CERTIFICATE OF CORRECTION

PATENT NO. : 6,676,095 B2
DATED : January 13, 2004
INVENTOR(S) : Dal Pra'

It is certified that error appears in the above-identified patent and that said Letters Patent is hereby corrected as shown below:

Column 5,
Line 1, after the word "tube", insert -- (12) --.
Line 2, after the word "slit", delete -- (12)" --.

Column 6,
Line 24, after the word "of", delete "30", and insert therefore -- claim 13 --.

Signed and Sealed this

Tenth Day of August, 2004

JON W. DUDAS
*Acting Director of the United States Patent and Trademark Office*